US010438517B2

United States Patent
Murayama et al.

(10) Patent No.: US 10,438,517 B2
(45) Date of Patent: Oct. 8, 2019

(54) MEDIUM AND TAPE CARTRIDGE

(71) Applicant: BROTHER KOGYO KABUSHIKI KAISHA, Nagoya-shi, Aichi-ken (JP)

(72) Inventors: Kentaro Murayama, Kasugai (JP); Kazuyuki Katagiri, Toyota (JP); Daisuke Baba, Iwakura (JP); Yukihiko Sato, Nagoya (JP); Shota Iijima, Nagoya (JP); Haruki Matsumoto, Nagoya (JP); Harumitsu Inoue, Toki (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/714,121

(22) Filed: Sep. 25, 2017

(65) Prior Publication Data
US 2018/0286292 A1      Oct. 4, 2018

(30) Foreign Application Priority Data

Mar. 31, 2017  (JP) ................................ 2017-073180

(51) Int. Cl.
*G09F 3/20* (2006.01)
*G09F 3/00* (2006.01)
(Continued)

(52) U.S. Cl.
CPC ................ *G09F 3/205* (2013.01); *G09F 3/02* (2013.01); *G09F 3/0295* (2013.01); *G09F 3/10* (2013.01);
(Continued)

(58) Field of Classification Search
CPC .......... G09F 3/0295; G09F 3/10; G09F 3/205; G09F 2003/0222; G09F 2003/0229;
(Continued)

(56) References Cited

U.S. PATENT DOCUMENTS 1,337,722 A * 4/1920 Porter ....................... G09F 3/10
                                                                40/665
2,818,168 A * 12/1957 Tobey ....................... G09F 3/10
                                                                156/DIG. 6
(Continued)

FOREIGN PATENT DOCUMENTS

EP        2 283 477 A1    2/2011
EP        2 631 893 A1    8/2013
(Continued)

OTHER PUBLICATIONS

Extended European Search Report dated Apr. 24, 2018 received from the European Patent Office in related application EP 17193139.7.

*Primary Examiner* — David R Dunn
*Assistant Examiner* — Christopher E Veraa
(74) *Attorney, Agent, or Firm* — Scully, Scott, Murphy & Presser, P.C.

(57) ABSTRACT

A medium includes a base layer and a separation layer. Regions are defined along a first direction. The regions include: a first region in which a portion of the medium which is in contact with the separation layer includes opposite end portions in a second direction, and at least the opposite end portions are stickable; a second region in which a portion of the medium which is in contact with the separation layer is non-stickable; and a third region in which a portion of the medium which is in contact with the separation layer is stickable. A longest length of the first region in the second direction is less than a length of the second region or the third region in the second direction at a particular position in the first direction.

11 Claims, 11 Drawing Sheets

(51) Int. Cl.
*G09F 3/10* (2006.01)
*G09F 3/02* (2006.01)

(52) U.S. Cl.
CPC .... *B32B 2519/00* (2013.01); *G09F 2003/023* (2013.01); *G09F 2003/0222* (2013.01); *G09F 2003/0229* (2013.01); *G09F 2003/0248* (2013.01); *G09F 2003/0251* (2013.01); *G09F 2003/0257* (2013.01); *G09F 2003/0266* (2013.01)

(58) Field of Classification Search
CPC ....... G09F 2003/023; G09F 2003/0247; B32B 2519/00
See application file for complete search history.

(56) References Cited

U.S. PATENT DOCUMENTS

| | | | | |
|---|---|---|---|---|
| 2,914,166 | A * | 11/1959 | Bihler | G09F 3/0295 206/526 |
| 3,228,129 | A * | 1/1966 | Dover | G09F 3/10 283/80 |
| 4,579,759 | A * | 4/1986 | Breuers | H01B 7/36 174/112 |
| 4,656,767 | A * | 4/1987 | Tarrant | G09F 3/04 174/112 |
| 5,279,057 | A * | 1/1994 | Melin | G09F 3/00 40/630 |
| 5,324,078 | A * | 6/1994 | Bane | G09F 3/10 281/2 |
| 5,342,093 | A * | 8/1994 | Weernink | G09F 3/10 283/81 |
| 6,274,236 | B1 * | 8/2001 | Shacklett | B31D 1/021 428/354 |
| 6,641,048 | B1 | 11/2003 | Schintz et al. | |
| 7,527,843 | B2 * | 5/2009 | Bethune | B31D 1/021 428/40.1 |
| 8,595,963 | B2 * | 12/2013 | Olivarez | G09F 3/0295 40/316 |
| 2006/0134365 | A1 * | 6/2006 | Blank | G09F 3/10 428/42.3 |
| 2009/0277570 | A1 * | 11/2009 | Caveney | G09F 3/0295 156/184 |
| 2010/0132881 | A1 * | 6/2010 | Gaughan | B31D 1/021 156/249 |
| 2010/0313454 | A1 * | 12/2010 | Smith, Jr. | G09F 3/0295 40/316 |
| 2011/0259775 | A1 * | 10/2011 | Bratter | B32B 37/02 206/449 |
| 2013/0305576 | A1 * | 11/2013 | Takashima | G09F 3/005 40/633 |
| 2015/0161917 | A1 * | 6/2015 | DeLise, Jr. | B31D 1/021 156/227 |
| 2015/0251464 | A1 * | 9/2015 | Kubota | G09F 3/0295 347/104 |
| 2017/0186343 | A1 * | 6/2017 | Hansen | G09F 3/0288 |

FOREIGN PATENT DOCUMENTS

| | | |
|---|---|---|
| JP | 2011-524154 A | 8/2011 |
| WO | 2009/137756 A1 | 11/2009 |
| WO | 2009/137756 A4 | 11/2009 |
| WO | WO-2016025835 A1 * | 2/2016 ........... G09F 3/0295 |

\* cited by examiner

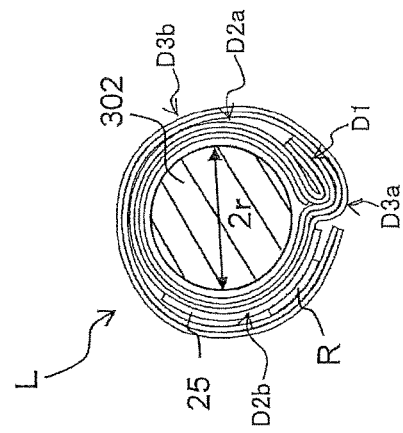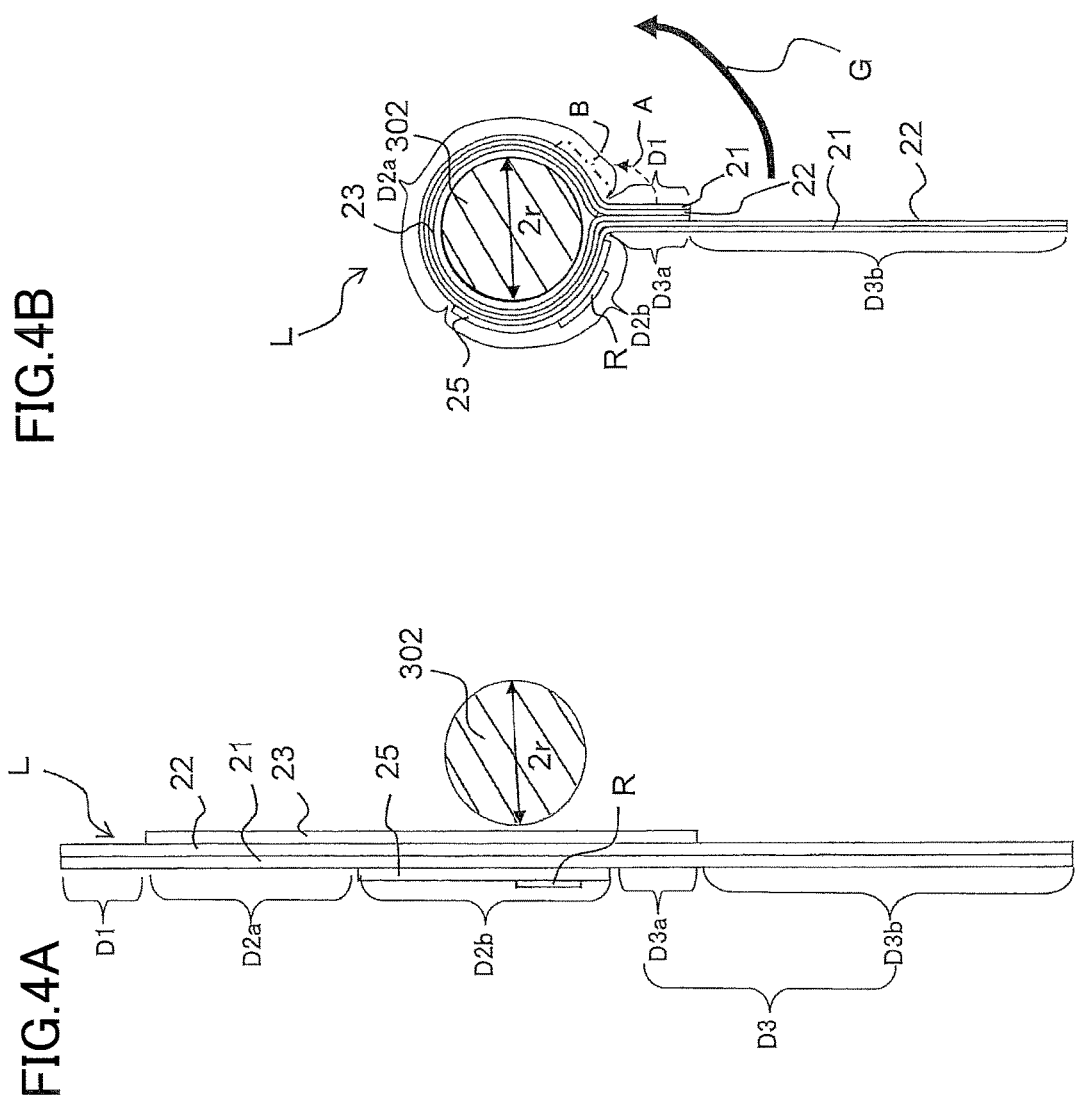

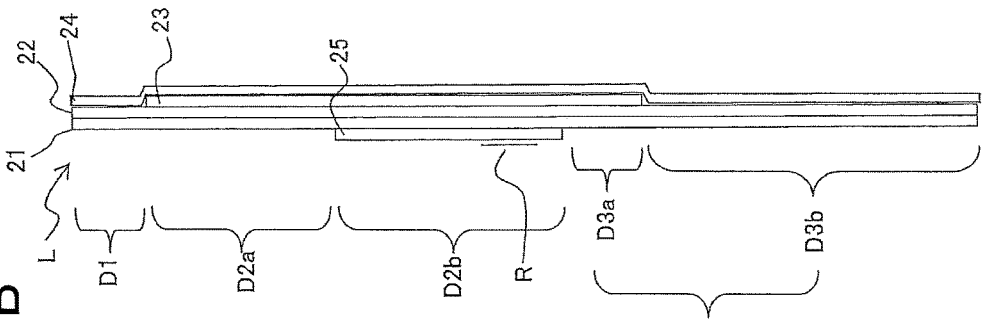
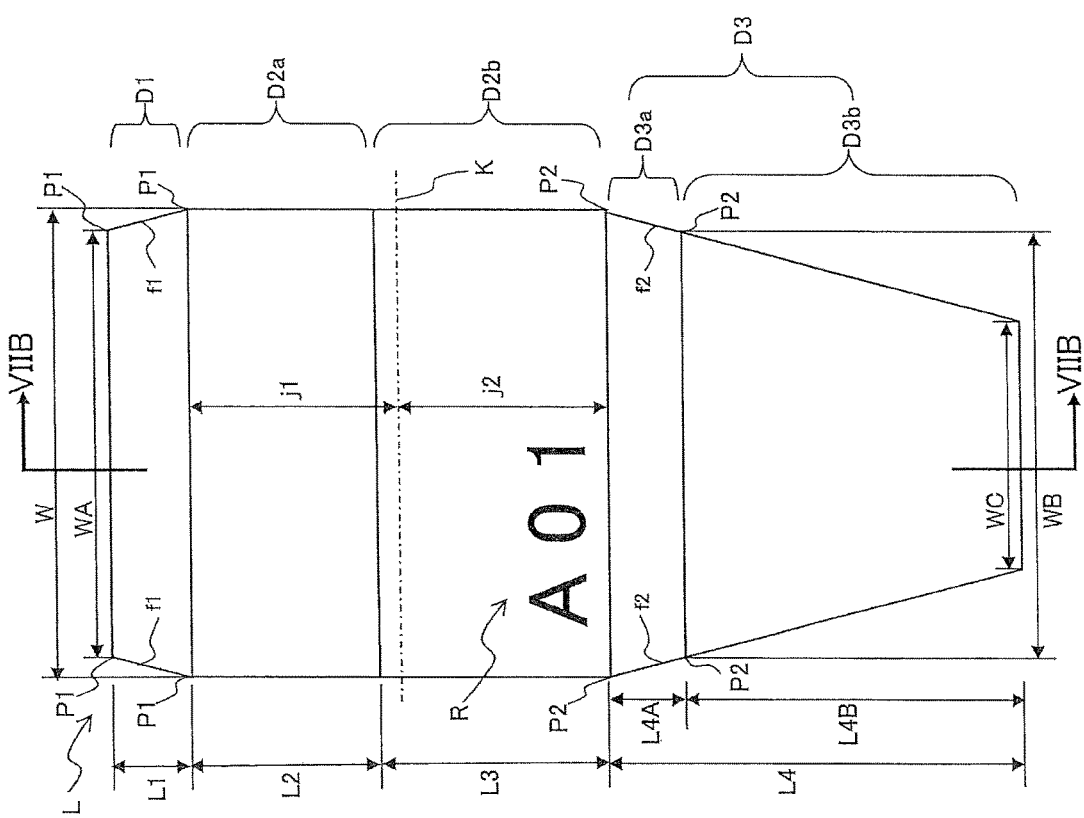

MEDIUM AND TAPE CARTRIDGE

CROSS REFERENCE TO RELATED APPLICATION

The present application claims priority from Japanese Patent Application No. 2017-073180, which was filed on Mar. 31, 2017, the disclosure of which is herein incorporated by reference in its entirety.

BACKGROUND

The following disclosure relates to a medium to be attached to a wrapped member and to a tape cartridge accommodating the medium.

There is known a medium to be attached to an outer circumferential portion of a cable or a circular cylindrical wrapped member, for example. This medium includes a base layer, an adhesive layer, and a separation layer stacked on each other. The medium includes: a one-side adhesive region in which a back surface of the medium becomes adhesive after the separation layer is peeled off; a non-adhesive region which is contiguous to the one-side adhesive region and in which a printing background layer is provided, and the back surface of the medium is not stickable; and an other-side adhesive region which is contiguous to the non-adhesive region and in which the back surface of the medium is partly adhesive.

SUMMARY

In this conventional medium, the back surface (i.e., an inner circumferential surface) of the portion of the medium in the one-side adhesive region is first stuck to the outer circumferential portion of the wrapped member with adhesive. The portion of the medium in the non-adhesive region contiguous to the one-side adhesive region is then wrapped around the wrapped member so as to form a cylindrical member. The back surface (i.e., the inner circumferential surface) of the portion of the medium in the other-side adhesive region is then stuck to an outer circumferential surface of the portion of the medium in the non-adhesive region with adhesive. A user then breaks the medium along perforation formed in advance between the one-side adhesive region and the non-adhesive region in a state in which the portions of the medium in the one-side adhesive region and the non-adhesive region adhere to the wrapped member. As a result, a unit of the portions of the medium in the non-adhesive region and the other-side adhesive region is separated from the portion of the medium in the one-side adhesive region, whereby the cylindrical medium rotatable around the wrapped member (i.e., a rotational label) is completed.

The above-described technique however requires the user to break the medium along the perforation. This breakage may produce an additional force such as a twisting of the wrapped member, which may unfortunately affect durability of the medium and the wrapped member.

Accordingly, an aspect of the disclosure relates to a medium attachable rotatably around a wrapped member without additional force and to a tape cartridge accommodating the medium.

In one aspect of the disclosure, a medium includes a transparent base layer and a separation layer stacked on each other in a stacking direction. A plurality of regions are defined in the medium along a first direction orthogonal to the stacking direction. The plurality of regions include: a first region in which a portion of the medium which is in contact with the separation layer includes opposite end portions in a second direction orthogonal to each of the first direction and the stacking direction, and at least the opposite end portions are stickable; a second region which is located on one side of the first region in the first direction and in which a portion of the medium which is in contact with the separation layer is non-stickable; and a third region which is located on the one side of the second region in the first direction and in which a portion of the medium which is in contact with the separation layer is stickable. A longest length of the first region in the second direction is less than a length of one of the second region and the third region in the second direction at a particular position in the first direction.

In another aspect of the disclosure, a tape cartridge includes: a housing; and a tape roll that is a roll of a tape contained in the housing and including a transparent base layer and a separation layer stacked on each other in a stacking direction. A plurality of regions are defined in the tape along a first direction orthogonal to the stacking direction. The plurality of regions include: a first region in which a portion of the tape which is in contact with the separation layer includes opposite end portions in a second direction orthogonal to each of the first direction and the stacking direction, and at least the opposite end portions are stickable; a second region which is located on one side of the first region in the first direction and in which a portion of the tape which is in contact with the separation layer is non-stickable; and a third region which is located on the one side of the second region in the first direction and in which a portion of the tape which is in contact with the separation layer is stickable. A longest length of the first region in the second direction is less than a length of one of the second region and the third region in the second direction at a particular position in the first direction.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIGS. 4A through 4C are views for explaining a procedure of attachment of the print label to a wrapped member;

FIG. 7A is a plan view of a print label in a modification in which an adhesive region D3$b$ has another shape;

FIG. 7B is a cross-sectional view taken along line VIIB-VIIB in FIG. 7A;

DETAILED DESCRIPTION OF THE EMBODIMENT

Hereinafter, there will be described one embodiment by reference to the drawings.

Label Creating Apparatus

There will be described a label creating apparatus according to the present embodiment with reference to FIG. 1.

Figure 1:
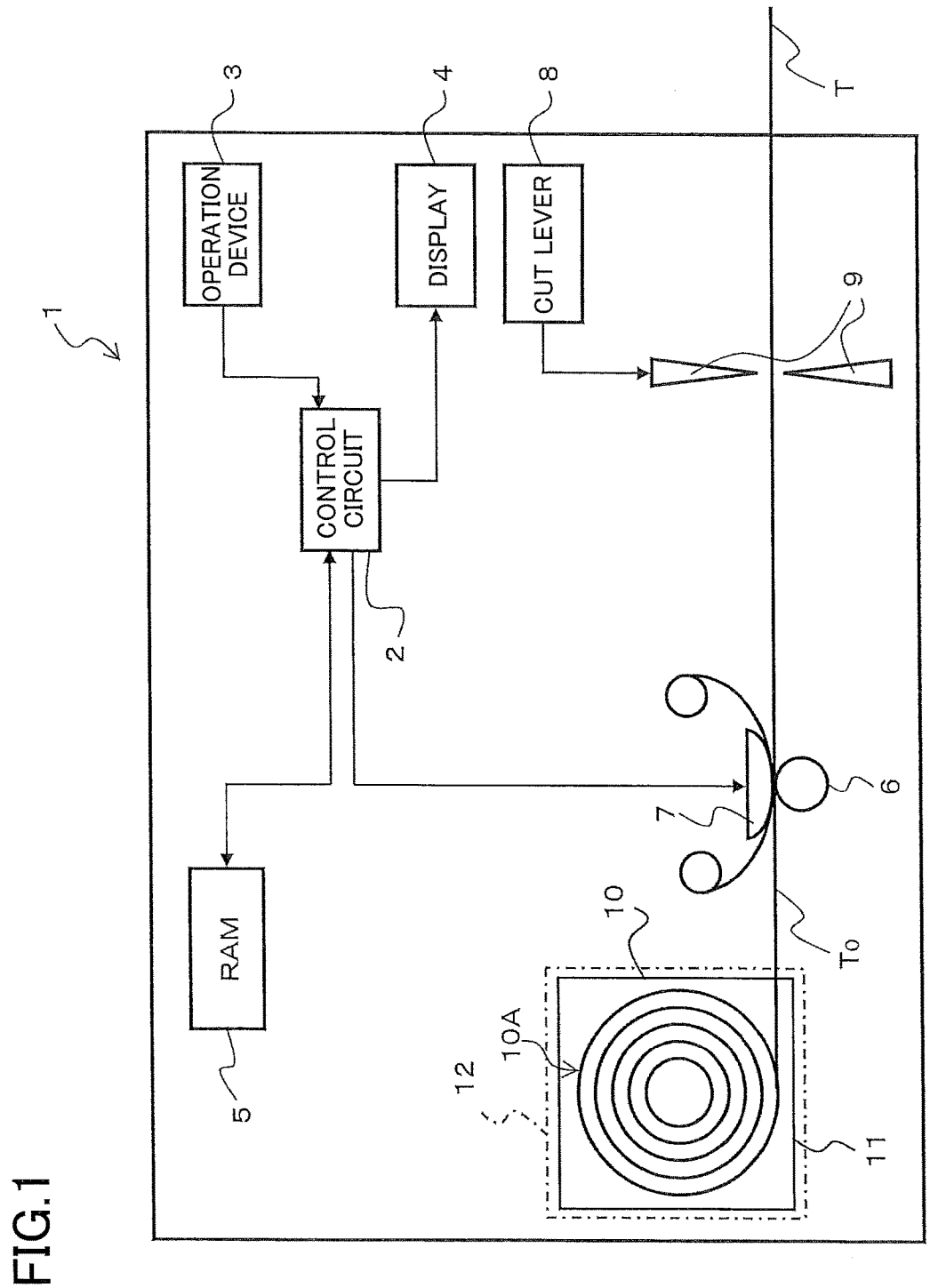
FIG. 1 is a view for explaining a general structure of a label creating apparatus according to one embodiment.

In FIG. 1, a label creating apparatus 1 as one example of a printing apparatus includes: a control circuit 2; an operation device 3 configured to accept operations of a user (an operator); a display 4; a random-access memory (RAM) 5 configured to store various kinds of information; a conveying roller 6; a print head 7; a cut lever 8; and cutters 9.

The label creating apparatus 1 includes a cartridge holder 12 having a housing 11, on which a tape cartridge 10 is mountable removably. The tape cartridge 10 accommodates a tape roll 10A having a spiral shape. It is noted that FIG. 1 illustrates the tape roll 10A in the form of concentric circles for simplicity. The tape roll 10A is a roll of a print tape To as one example of a tape. Examples of the tape cartridge 10 include: a tape cartridge of a die-cut-label type in which the print tape To having half-cut regions HC (see FIGS. 2A and 2B which will be described below) formed by half cut (kiss cut) of the print tape To is rolled; and a tape cartridge of what is called a continuous type in which the print tape To having no half-cut regions HC is rolled. In the label creating apparatus 1, any of the types of the tape cartridge 10 can be used. It is noted that the following explanation is provided assuming that the tape cartridge 10 of the die-cut-label type is used, unless otherwise specified.

The control circuit 2 includes a central processing unit (CPU) and a read-only memory (ROM), not illustrated. The control circuit 2 is configured to execute various programs stored in the ROM and control overall operations of the label creating apparatus 1 while using a temporary storage function of the RAM 5.

The conveying roller 6 is opposed to the print head 7. The print tape To fed from the tape roll 10A is nipped between the conveying roller 6 and the print head 7. The conveying roller 6 is rotated to convey the print tape To while drawing the print tape To out from the tape roll 10A.

The print head 7 is configured to print a desired print object, such as characters and figures, on each of label portions (which will be described later in detail) of the print tape To conveyed by the conveying roller 6.

The cutters 9 are actuated by user's operation of the cut lever 8 to cut a print tape T (which will be described later in detail) on which a plurality of print labels L are printed along a conveying direction. It is noted that each of the print tapes To, T is one example of a medium.

Print Tape

Figure 2A:
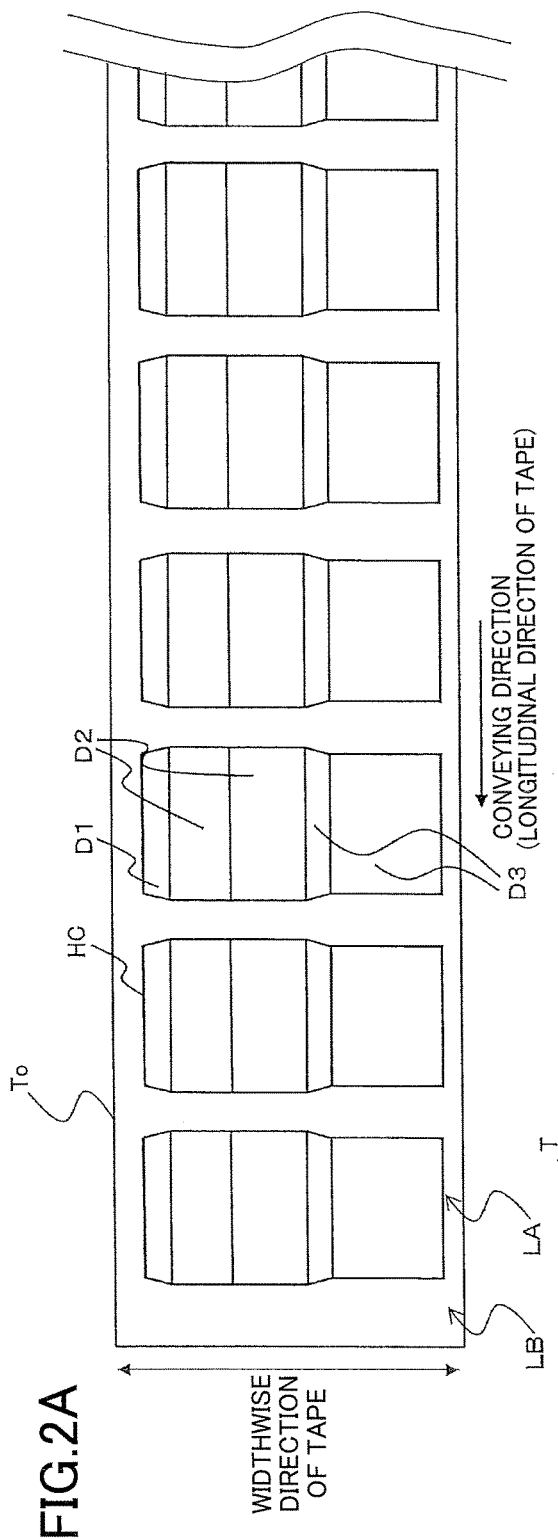
FIG. 2A is a plan view illustrating a print tape before printing.

FIG. 2A illustrates the print tape To. FIG. 2A is a plan view of the print tape To in an unprinted state. In FIG. 2A, the right and left direction coincides with the conveying direction (in other words, the longitudinal direction of the tape), the up and down direction coincides with the widthwise direction of the tape, and the front and back direction of the sheet on which FIG. 2A is illustrated coincides with the thickness direction of the tape. In FIG. 2A, the print tape To has substantially rectangular half-cut regions HC (not illustrated) formed by cutting a base layer 21 and an adhesive layer 22. Portions of the print tape To inside the half-cut regions HC are label portions LA, and a portion of the print tape To outside the half-cut regions HC is a non-label portion LB. It is noted that a print tape from which the non-label portion LB is peeled off in advance may be used as the print tape To. The label portions LA are arranged in the longitudinal direction of the tape. Each of the label portions LA includes an adhesive region D1, a non-adhesive region D2, and a partly-adhesive region D3 arranged in order toward one side in the widthwise direction of the tape (downward in FIG. 2A). These regions will be described below.

Figure 2B:
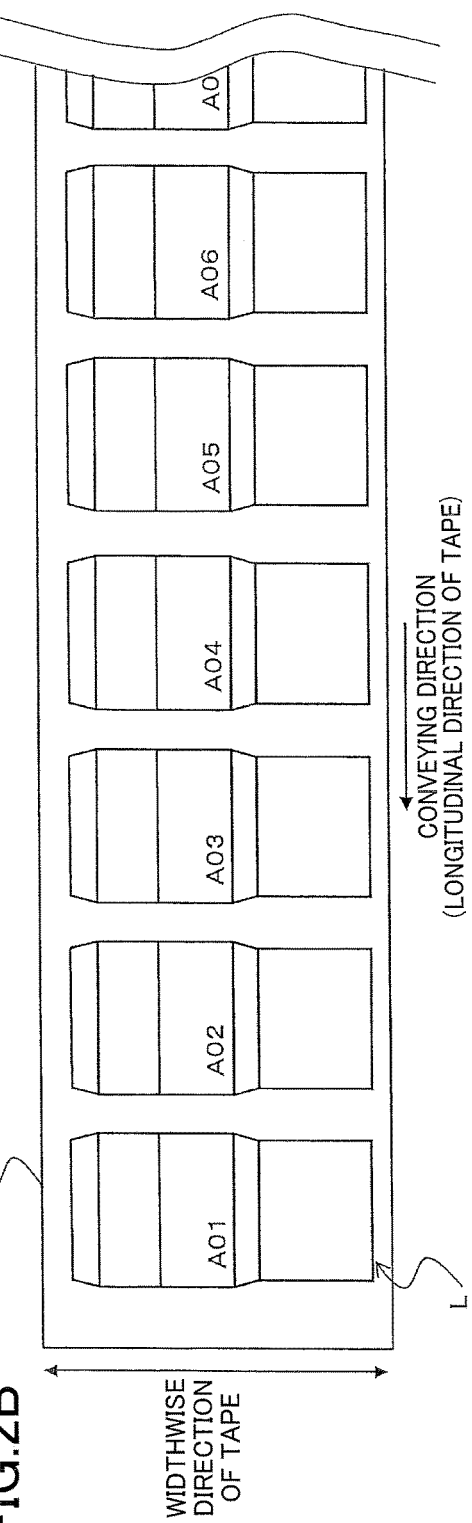
FIG. 2B is a plan view illustrating the print tape after printing.

FIG. 2B illustrates the print tape T on which character strings R are formed. In this example, FIG. 2B is a plan view of the print tape T after the character strings R are respectively printed on printing background layers 25 (which will be described below) in the non-adhesive regions D2 of the regions D1-D3. In this example, as illustrated in FIG. 2B, text objects as the print objects, i.e., the character strings R ("A01", "A02", "A03", and so on) are formed in order by the print head 7 on the respective label portions LA to create the print labels L.

Print Label

Figure 3B:
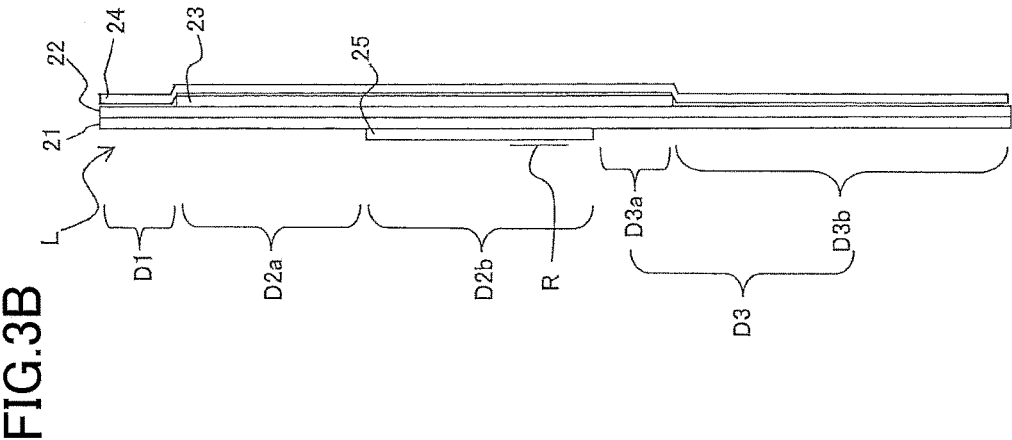
FIG. 3B is a cross-sectional view taken along line IIIB-IIIB in FIG. 3A.
Figure 3A:
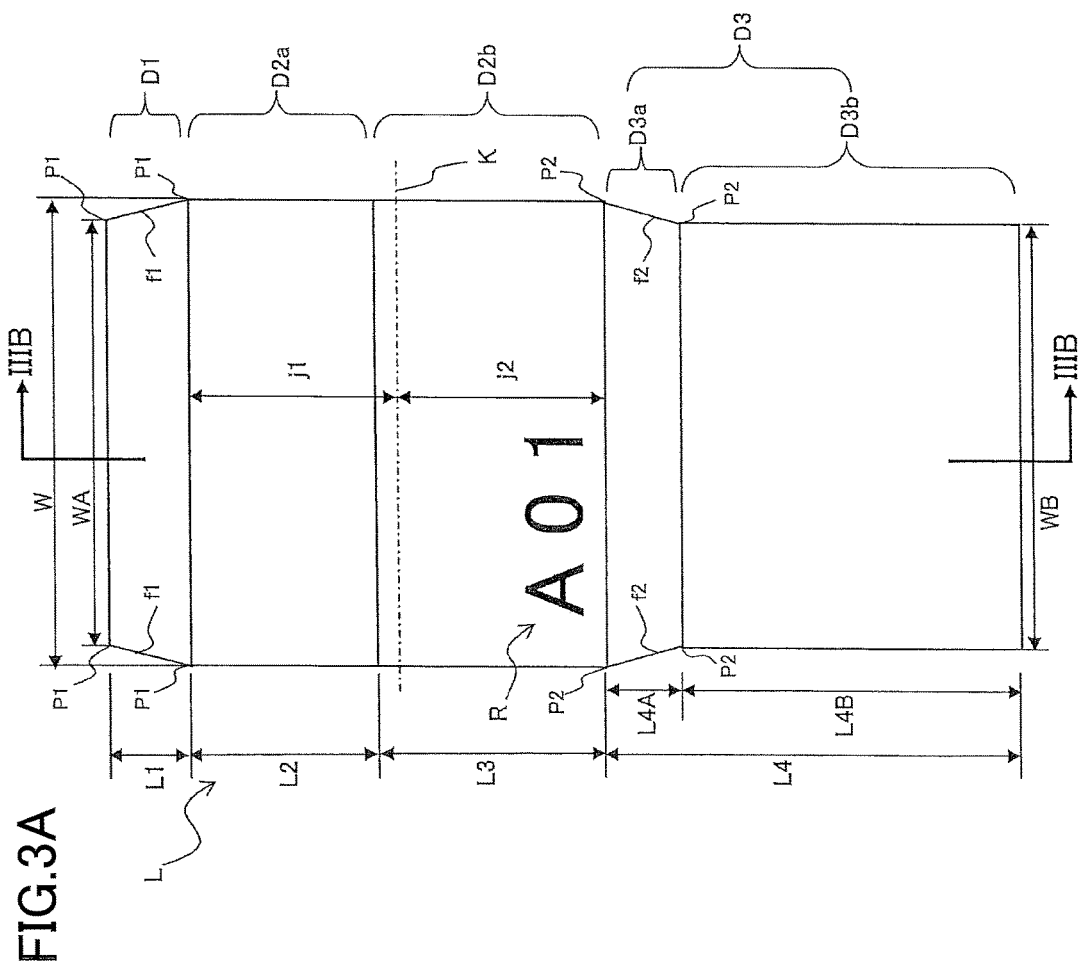
FIG. 3A is a development plan view of a print label.

There will be next described the structure of the print label L with reference to FIGS. 3A and 3B. FIG. 3A is plan view of one print label L separated from the non-label portion LB. FIG. 3B is a cross-sectional view taken along line IIIB-IIIB in FIG. 3A.

In FIGS. 3A and 3B, each of the print labels L is constituted by the transparent base layer 21, the transparent adhesive layer 22, a transparent non-adhesive layer 23, and a separation layer 24 which are stacked on one another from the left side toward the right side in FIG. 3B (from the front side toward the back side in FIG. 3A) in a thickness direction of the print label L (i.e., the depth direction of the sheet in FIG. 3A and the right and left direction in FIG. 3B). The thickness direction is one example of a stacking direction in which the layers are stacked on one another. It is noted that since each of the print tapes To, T has this stacking structure, each of the print tapes To, T has the base layer 21, the adhesive layer 22, the non-adhesive layer 23, and the separation layer 24 each elongated in the right and left direction in FIGS. 2A and 2B (as one example of a second direction orthogonal to each of a first direction and the thickness direction).

The printing background layer 25 having a non-transparent color on which the character string R is formed by the print head 7 is provided on a portion of a front surface of the base layer 21 (i.e., a left surface thereof in FIG. 3B which is a one-side surface thereof in the thickness direction). The non-adhesive layer 23 is provided between a portion of the adhesive layer 22 and a portion of the separation layer 24. While the adhesive layer 22 is provided on the entire back surface of the base layer 21 (i.e., a right surface in FIG. 3B which is an other-side surface thereof in the thickness direction) between the base layer 21 and the separation layer 24 in this example, the adhesive layer 22 may be provided on a portion of the back surface of the base layer 21.

In view of the above, the print label L has four regions along the direction orthogonal to the thickness direction (i.e., the up and down direction in FIGS. 3A and 3B, the circumferential direction of a wrapped member 302 which will be described below, and the first direction). The four regions include: the adhesive region D1 constituting an upper end portion of the print label L in FIGS. 3A and 3B in the first direction (noted that the upper side in FIGS. 3A and 3B may be referred to as "the other side in the first direction"); a non-adhesive region D2a located contiguous to and under the adhesive region D1 in FIGS. 3A and 3B (noted that the lower side in FIGS. 3A and 3B may be referred to as "one side in the first direction"); a non-adhesive region D2b located contiguous to and under the non-adhesive region D2a in FIGS. 3A and 3B; and the partly-adhesive region D3 located contiguous to and under the non-adhesive region D2b in FIGS. 3A and 3B.

In the adhesive region D1, the base layer 21, the adhesive layer 22, and the separation layer 24 are stacked in order from the one side toward the other side in the thickness direction (from the left side toward the right side in FIG. 3B). Thus, the entire portion of the adhesive region D1 which is in contact with the separation layer 24 has adhesiveness owing to the adhesive layer 22. The adhesiveness is one example of stickability in this specification. It is noted that the adhesive region D1 has a length L1 in the first direction. It is noted that a region in the print label L which is occupied by the adhesive region D1 extends in the first direction by the length L1 from an upper end of the print label L in the first direction, and is interposed in the second direction between opposite end portions of the base layer 21 in the second direction in the region extending from the upper end by the length L1.

In the non-adhesive region D2a, the base layer 21, the adhesive layer 22, the non-adhesive layer 23, and the separation layer 24 are stacked in order from the one side toward the other side in the thickness direction (from the left side toward the right side in FIG. 3B). Thus, the entire portion of the non-adhesive region D2a which is in contact with the separation layer 24 is not adhesive (non-adhesiveness) because the adhesiveness of the adhesive layer 22 is interrupted by the non-adhesive layer 23. It is noted that the non-adhesiveness is one example of non-stickability in this specification. It is noted that the non-adhesive region D2a has a length L2 in the first direction. It is noted that a region in the print label L which is occupied by the non-adhesive region D2a extends in the first direction by the length L2 from a lower end of the adhesive region D1, and is interposed in the second direction between the opposite end portions of the base layer 21 in the second direction in the region extending from the lower end of the adhesive region D1 by the length L2.

In the non-adhesive region D2b, the printing background layer 25, the base layer 21, the adhesive layer 22, the non-adhesive layer 23, and the separation layer 24 are stacked in order from the one side toward the other side in the thickness direction (from the left side toward the right side in FIG. 3B). Thus, the entire portion of the non-adhesive region D2b which is in contact with the separation layer 24 is not adhesive because the adhesiveness of the adhesive layer 22 is interrupted by the non-adhesive layer 23. In this example, the printing background layer (ink coated layer) 25 is formed by coating the base layer 21 with ink of an appropriate color, for example. The character string R (the text "A01") is formed by the print head 7 on the printing background layer 25. It is noted that the non-adhesive region D2b has a length L3 in the first direction. A region in the print label L which is occupied by the non-adhesive region D2b extends in the first direction by the length L3 from a lower end of the non-adhesive region D2a and is interposed in the second direction between the opposite end portions of the base layer 21 in the second direction in the region extending from the lower end of the non-adhesive region D2a by the length L3.

The partly-adhesive region D3 includes: a non-adhesive region D3a provided contiguous to and under the non-adhesive region D2b in FIGS. 3A and 3B; and an adhesive region D3b provided contiguous to and under the non-adhesive region D3a in FIGS. 3A and 3B and defines a lower end of the print label L in the first direction in FIGS. 3A and 3B.

In the non-adhesive region D3a, the base layer 21, the adhesive layer 22, the non-adhesive layer 23, and the separation layer 24 are stacked in order from the one side toward the other side in the thickness direction (from the left side toward the right side in FIG. 3B). Thus, the entire portion of the non-adhesive region D3a which is in contact with the separation layer 24 is not adhesive because the adhesiveness of the adhesive layer 22 is interrupted by the non-adhesive layer 23. It is noted that the non-adhesive region D3a has a length L4A in the first direction. A region in the print label L which is occupied by the non-adhesive region D3a extends in the first direction by the length L4A from a lower end of the non-adhesive region D2b, and is interposed in the second direction between the opposite end portions of the base layer 21 in the second direction in the region extending from the lower end of the non-adhesive region D2b by the length L4A.

In the adhesive region D3b, the base layer 21, the adhesive layer 22, and the separation layer 24 are stacked in order from the one side toward the other side in the thickness direction (from the left side toward the right side in FIG. 3B). Thus, at least a part of a portion of the adhesive region D3b, which portion is in contact with the separation layer 24, has adhesiveness owing to the adhesive layer 22. It is noted that the adhesive region D3b has a length L4B in the first direction. As a result, the partly-adhesive region D3 has a length L4 (=L4A+L4B) in the first direction, and at least a portion of the partly-adhesive region D3 is adhesive. A region in the print label L which is occupied by the adhesive region D3b extends in the first direction by the length L4B from a lower end of the non-adhesive region D3a, and is interposed in the second direction between the opposite end portions of the base layer 21 in the second direction in the region extending from the lower end of the non-adhesive region D3a by the length L4B.

It is noted that a well-known release processing is applied at least to a surface of the separation layer 24 which is in contact with the adhesive layer 22 in the adhesive region D1 and to a surface of the separation layer 24 which is in contact with the adhesive layer 22 in a portion of the partly-adhesive region D3 (e.g., the adhesive region D3b). As a result, when the separation layer 24 is peeled off, the adhesive layer 22 clings to the base layer 21 and is kept unseparated therefrom at least in the adhesive region D1 and the adhesive region D3b. The release processing may not be applied to the surface of the separation layer 24 which is in contact with the adhesive layer 22 in the adhesive region D1 but be applied to the surface of the base layer 21 which is in contact with the adhesive layer 22 in the adhesive region D1. With this structure, when the separation layer 24 is peeled off, the adhesive layer 22 does not remain on the base layer 21 in the adhesive region D1. In the region D3a, in this case, the base layer 21, the adhesive layer 22, and the separation layer 24 need to be stacked in order from the one side toward the other side in the thickness direction, and the release processing needs to be applied to the separation layer 24. Also, the base layer 21 does not have perforation or slits (except the half-cut regions HC), and the cross-sectional shape of the base layer 21 in the thickness direction is continuous in the first direction.

In the above-described construction, the adhesive region D1 has an isosceles trapezoid outer shape having four first vertexes P1 as corners of the isosceles trapezoid. Likewise, the non-adhesive region D3a has an isosceles trapezoid outer shape having four second vertexes P2 at corners of the isosceles trapezoid. The isosceles trapezoids of the two regions D1, D3a are symmetric with respect to the axis K extending through the non-adhesive region D2b along the second direction orthogonal to each of the first direction and the stacking direction in which the layers are stacked on one another. As illustrated in FIG. 3A, a distance j1 between the lower end of the adhesive region D1 and the axis K is equal to a distance j2 between an upper end of the non-adhesive region D3a and the axis K. It is noted that the outer shape of the portion of the base layer 21 in the adhesive region D1 matches the outer shape of the adhesive region D1 and also matches the outer shape of the isosceles trapezoid having the four first vertexes P1. Likewise, the outer shape of the portion of the base layer 21 in the non-adhesive region D3a matches the outer shape of the non-adhesive region D3a and matches the outer shape of the isosceles trapezoid having the four second vertexes P2.

That is, the four first vertexes P1 and the four second vertexes P2 are symmetric with respect to the axis K. As a result, outer edges f1 of the adhesive region D1, each of which connects between corresponding adjacent two of the four first vertexes P1 and each of which constitutes a corresponding one of legs of the isosceles trapezoid, and outer edges f2 of the non-adhesive region D3a, each of which connects between corresponding adjacent two of the four second vertexes P2 and each of which constitutes a corresponding one of legs of the isosceles trapezoid, are symmetric with respect to the axis K.

The longest length WB of the adhesive region D3b in the second direction is less than the length W of the non-adhesive region D2a and the non-adhesive region D2b in the second direction. The shortest length WA of the adhesive region D1 in the second direction is less than the length W of the non-adhesive region D2a and the non-adhesive region D2b in the second direction.

Procedure of Attachment of Print Label to Wrapped Member

FIGS. 4A-4C illustrate one example of a procedure of attachment of the print labels L to the wrapped member. In this example, FIGS. 4A-4C illustrate one example of wrapping the print label L around the wrapped member 302 shaped like a circular cylinder or a cable and having a diameter 2r.

As illustrated in FIG. 4A, the separation layer 24 is first peeled off from the print label L having the above-described structure to expose the non-adhesive layer 23 and so on. While the print label L is constituted by the adhesive region D1, the non-adhesive region D2a, the non-adhesive region D2b, and the partly-adhesive region D3 arranged in this order, the print label L in the adhesive region D1, the non-adhesive region D2a, and the non-adhesive region D2b is then bent in a concave shape such that a portion of the print label L which had been in contact with the separation layer 24 (a right portion of the print label L in FIG. 4A) is located on an inner side (not illustrated).

As illustrated in FIG. 4B, the wrapped member 302 is placed on an inner portion of the concave portion of the print label L, and the print label L is wrapped around the wrapped member 302 so as to form a cylindrical member surrounding the wrapped member 302. Then, the adhesive layer 22 in the adhesive region D1 as a part of a distal end portion of the print label L (noted that the adhesive layer 22 in the adhesive region D1 serves as a sticking portion in inner-sides sticking which will be described below) and the non-adhesive layer 23 in the non-adhesive region D3a of the partly-adhesive region D3 (which serves as a stuck portion in the inner-sides sticking which will be described below) are stuck together. This sticking may be hereinafter referred to as "inner-sides sticking". In this state, the sum of the lengths L2, L3, L4A of the non-adhesive layer 23 in the first direction is at least greater than or equal to the circumference of a circle $2\pi r$ of the wrapped member 302. As a result, the shape of the print label L is fixed by sticking of the portions of the adhesive layer 22, and the print label L is wrapped around the wrapped member 302 in the non-adhesive region D2a and the non-adhesive region D2b without adhesive, whereby the print label L is rotatably attached to the wrapped member 302.

Thereafter, the rest portion (the adhesive region D3b in this example) of the partly-adhesive region D3 which is not used for surrounding the wrapped member 302 is wrapped around an outer circumferential portion of the print label L in the non-adhesive region D2a and the non-adhesive region D2b (see FIG. 4C) so as to cover the non-adhesive region D2a and the non-adhesive region D2b constituting the cylindrical member in this order such that the stuck portions of the print label L in the adhesive region D1 and the non-adhesive region D3a are folded into an inner circumferential side as indicated by arrow G in FIG. 4B (such that the adhesive region D1 as the sticking portion is folded along arrow A and brought into contact with an area B in FIG. 4B). The portion of the print label L in the adhesive region D3b of the partly-adhesive region D3 is stuck to the outer circumferential portion of the print label L in the non-adhesive region D2a and the non-adhesive region D2b using adhesiveness of the adhesive layer 22, and the attachment of the print label L to the wrapped member 302 is finished.

Example of Use of Print Label

Figure 5:
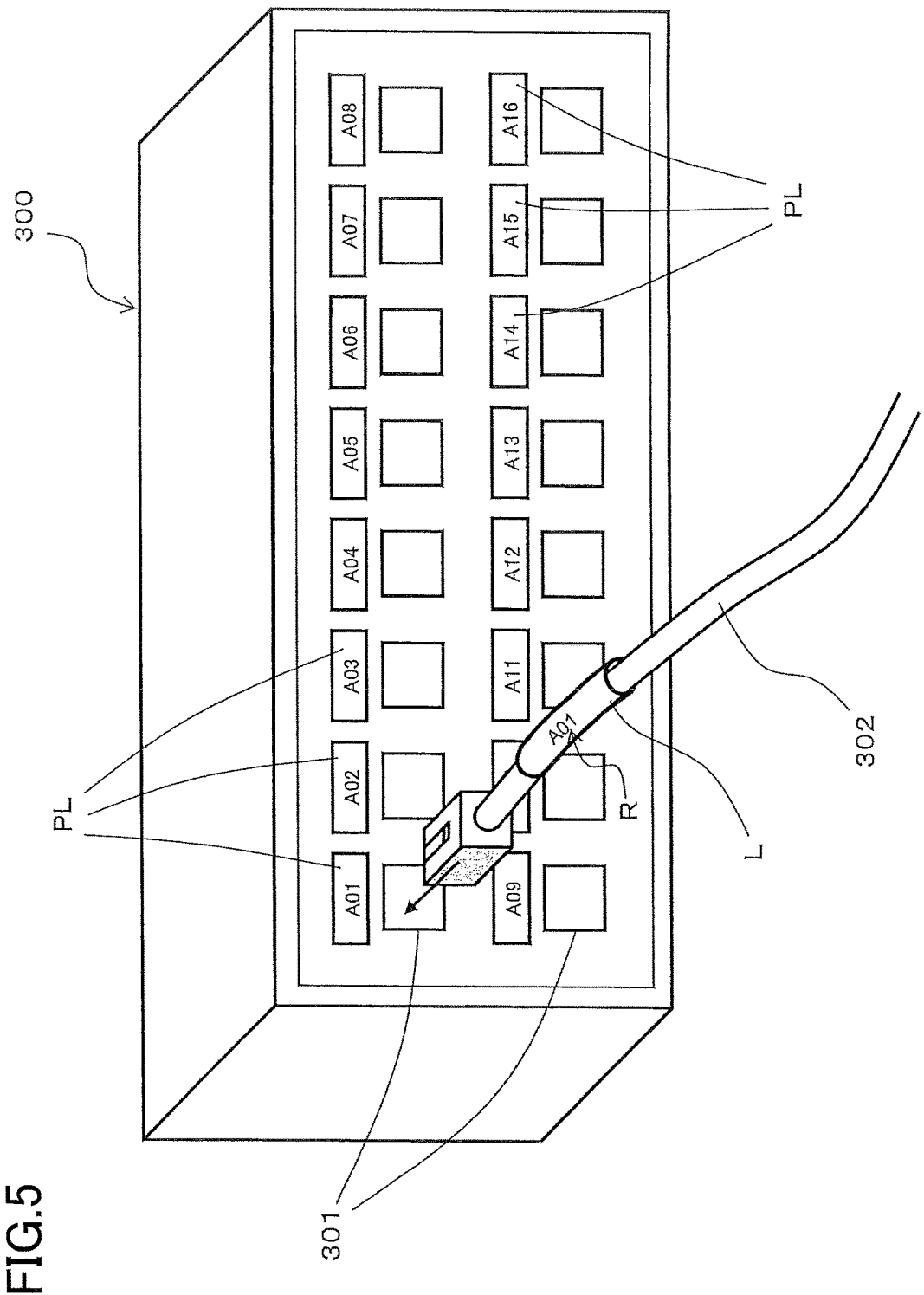
FIG. 5 is a perspective view illustrating an example of use of the print labels.

FIG. 5 illustrates one example of use of the print labels L. In this example, cables used for a switching hub configured to relay information over a wired LAN are used each as the wrapped member 302. These cables will be hereinafter referred to as "cables 302". As illustrated in FIG. 5, a switching hub 300 has sixteen slots 301, eight of which are formed in an upper portion of the switching hub 300, and the other eight of which are formed in a lower portion of the switching hub 300. In the illustrated example, plates PL indicating identification names "A01"-"A08" are provided respectively for the upper eight slots 301 so as to be arranged in this order from the left. Also, plates PL indicating identification names "A09"-"A16" are provided respectively for the lower eight slots 301 so as to be arranged in this order from the left.

Each of the cables 302 is connected to a corresponding one of the slots 301. For easy connection, the print labels L are attached to end portions of the respective cables 302 such that the same character strings R as the respective identification names of the slots 301 are printed on the respective print labels L to indicate the corresponding slots 301. That is, the print labels L on which the same texts as the identification names of the plates PL are printed are attached to the respective cables 302 to indicate which slot 31 each cable 302 is to be connected to. This configuration clarifies a relationship between the slots 301 and the cables 302, thereby preventing erroneous connection.

Figure 6A:
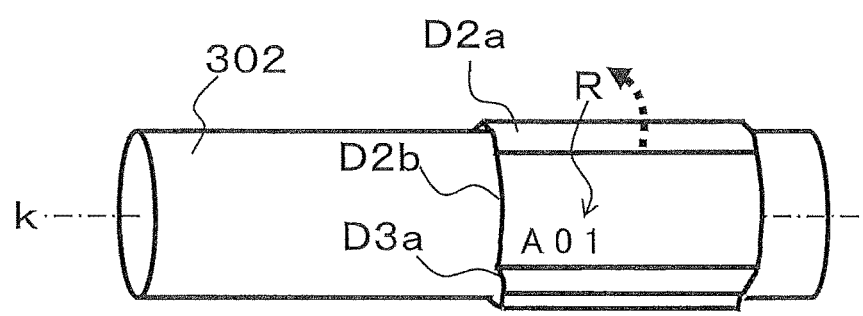
FIGS. 6A and 6B are schematic views each illustrating a state in which the print label is attached to a cable.
Figure 6B:
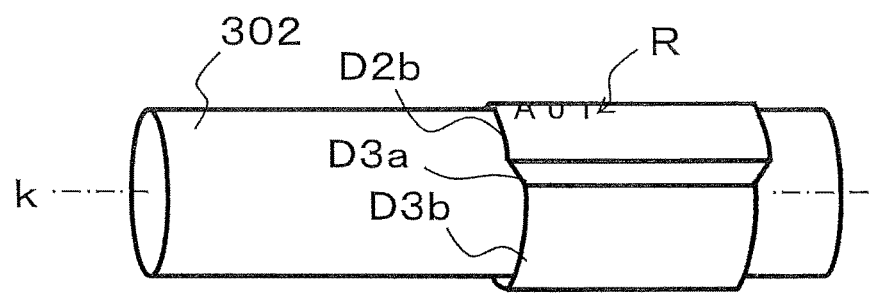

Each of FIGS. 6A and 6B schematically illustrates a state in which the print label L is attached to the cable 302. FIGS. 6A and 6B also illustrate axes k of the cables 302. As described above, the print label L is rotatably attached to the cable 302 as the wrapped member. In the state illustrated in FIG. 6A, for example, the print label L is in a state in which the non-adhesive region D2b in which the character string R representing "A01" is printed is on a front side in FIG. 6A. It is noted that the transparent adhesive region D3b covers the outer circumferential portion of the non-adhesive region D2b in reality as illustrated in FIG. 4C, but illustration of the transparent adhesive region D3b is omitted in FIGS. 6A and 6B for simplicity. When the print label L is rotated in a direction indicated by the broken-line arrow (i.e., in the circumferential direction) from the state illustrated in FIG. 6A, for example, the non-adhesive region D3a and the adhesive region D3b of the partly-adhesive region D3 of the print label L is located on the front side as illustrated in FIG. 6B. In the case where the print label L is fixed to the cable 302 at the position in FIG. 6B, the viewability of the character string R is low. However, since the print label L is rotatable in this example, the viewability of the character string R is increased by rotating the print label L in a direction reverse to the above-described direction to the position in FIG. 6A.

Effects

In the present embodiment as described above, the print label L is wrapped around the wrapped member 302 so as to form the cylindrical member surrounding the wrapped member 302. The portion of the adhesive layer 22 in the adhesive region D1 is then stuck by the inner-sides sticking to the portion of the non-adhesive layer 23 in the partly-adhesive region D3 (the non-adhesive region D3a in this example). The portion of the print label L in the partly-adhesive region D3 is then stuck to the outer circumferential portions of the print label L in the non-adhesive region D2a and the non-adhesive region D2b while covering the non-adhesive region D2a and the non-adhesive region D2b, whereby the print label L is attached to the wrapped member 302 without adhesive therebetween. In the present embodiment, the print label L has the shape that facilitates alignment between the portion of the adhesive layer 22 in the adhesive region D1 and the portion of the non-adhesive layer 23 in the partly-adhesive region D3 in the sticking. That is, the first vertexes P1 in the adhesive region D1 and the second vertexes P2 in the non-adhesive region D3a are symmetric with respect to the axis K. Specifically, the outer edges f1 of the adhesive region D1 and the outer edges f2 of the non-adhesive region D3a are constituted by the legs of the isosceles trapezoids which are symmetric with respect to the axis K. With this configuration, when the portion of the adhesive layer 22 in the adhesive region D1 is stuck to the portion of the non-adhesive layer 23 in the non-adhesive region D3a as described above, the four first vertexes P1 and the four second vertexes P2 (the outer edges f1 and the outer edges f2, in other words) respectively coincide with each other. Accordingly, it is possible to prevent misalignment and skew of the print label L and stick the portions of the print label L to each other in a proper posture.

In the present embodiment as described above, the print label L is attached to the wrapped member 302 by sticking the portion of the adhesive layer 22 in the adhesive region D1 and the portion of the non-adhesive layer 23 in the non-adhesive region D3a to each other to form the cylindrical member around the wrapped member 302. Thus, an additional force such as a twisting of the wrapped member 302 is not applied to the print label L and the wrapped member 302 as in the conventional structure in which the print label L is wrapped around the wrapped member 302 and cut along the perforation. Also, since the misalignment and skew are reduced during attachment, the print label L can be easily rotated around the wrapped member 302, thereby ensuring viewability from a desired angle.

In the present embodiment, in particular, the portion of the non-adhesive layer 23 in the non-adhesive region D3a is provided in the portion of the print label L in the partly-adhesive region D3, which portion is to be stuck to the portion of the adhesive layer 22 in the adhesive region D1. This configuration facilitates position correction in the above-described sticking (i.e., an operation of peeling the stuck print label L off and sticking the print label L again) when compared with the case where an adhesive layer is provided in the portion of the print label L in the partly-adhesive region D3, which portion is to be stuck to the portion of the adhesive layer 22 in the adhesive region D1.

In the present embodiment, in particular, it is possible to prevent the adhesive from being exposed or lying off the print label L due to the misalignment and skew in the structure having the adhesive layer 22. This prevents the exposed adhesive from adhering to a hand of the user when the user handles the print label L and prevents the wrapped print label L from adhering to the wrapped member 302 due to the exposed adhesive, which may make it difficult for the wrapped print label L to rotate.

Modifications

While the embodiment has been described above, it is to be understood that the disclosure is not limited to the details of the illustrated embodiment, but may be embodied with various changes and modifications, which may occur to those skilled in the art, without departing from the spirit and scope of the disclosure. There will be described modifications of the above-described embodiment. It is noted that the same reference numerals as used in the above-described embodiment are used to designate the corresponding elements of the modifications, and an explanation of which is simplified or dispensed with.

1. Case where Adhesive Region D3b has Another Shape

FIG. 7A is a plan view of the print label L in the present modification. FIG. 7B is a cross-sectional view taken along line VIIB-VIIB in FIG. 7A. FIGS. 7A and 7B respectively correspond to FIGS. 3A and 3B.

In FIGS. 7A and 7B, in the present modification, the length of the adhesive region D3b in the second direction decreases with increase in distance from the non-adhesive region D3a. Specifically, while the length of an upper end of the adhesive region D3b in FIG. 7A in the second direction is the length WB, the length of a lower end of the adhesive region D3b in FIG. 7A in the second direction is the length WC that is less than the length WB.

The present modification also achieves the same effects as those in the above-described embodiment.

2. Case with Marks

Figure 8B:
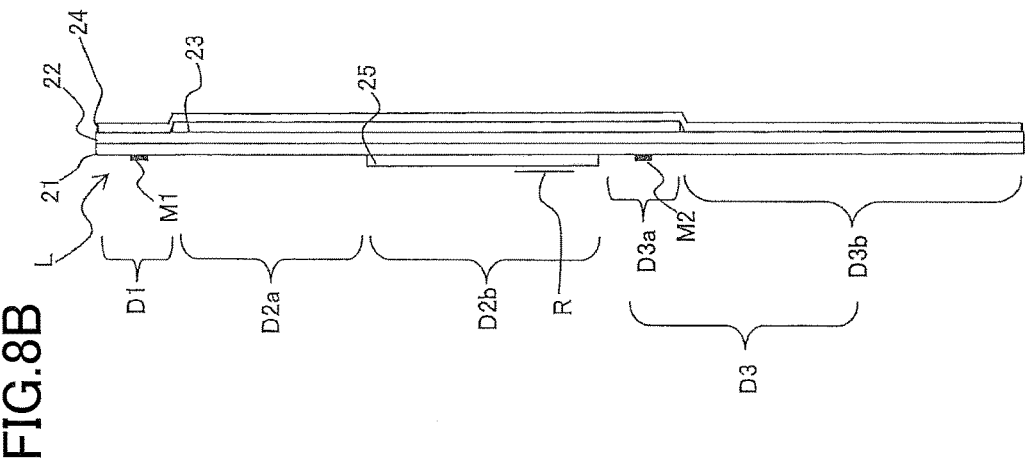
FIG. 8B is a cross-sectional view taken along line VIIIB-VIIIB in FIG. 8A.
Figure 8A:
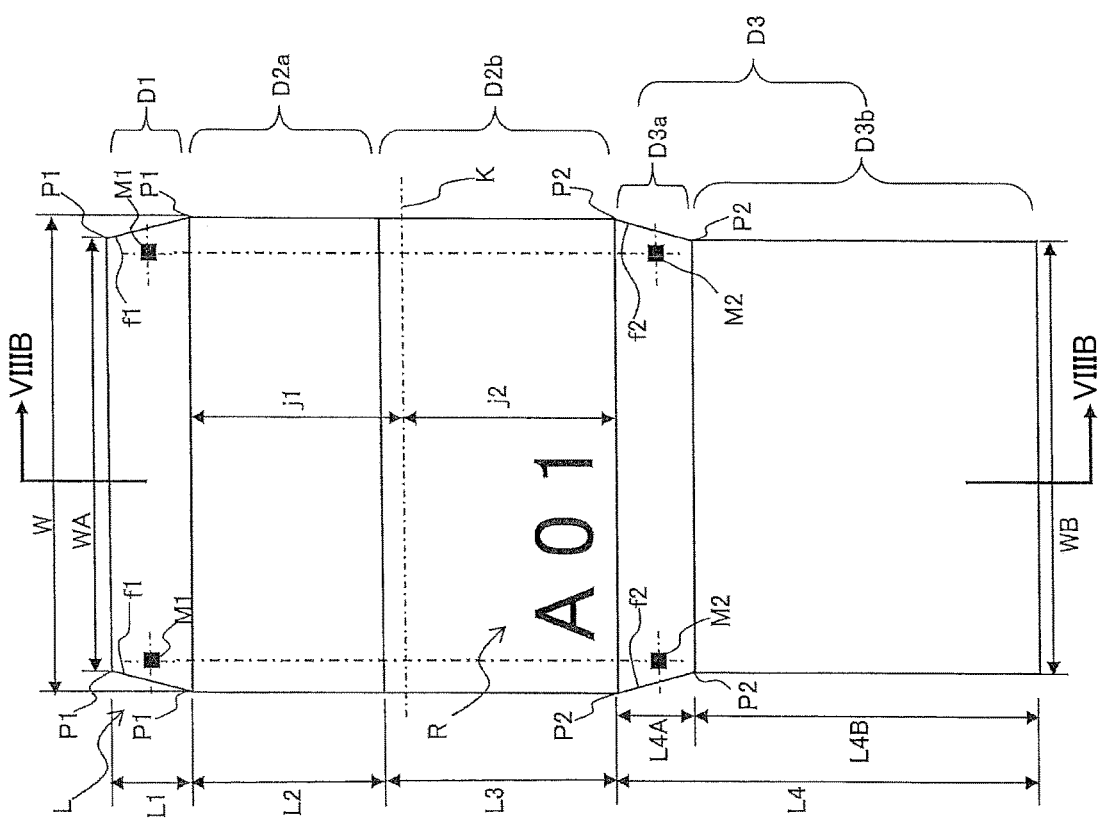
FIG. 8A is a plan view of a print label in a modification with marks.

FIG. 8A is a plan view of the print label L in the present modification. FIG. 8B is a cross-sectional view taken along line VIIIB-VIIIB in FIG. 8A. FIGS. 8A and 8B respectively correspond to FIGS. 3A and 3B.

In the present modification, as illustrated in FIGS. 8A and 8B, rectangular solid right and left first marks M1 are provided on the portion of the base layer 21 of the print label L in the adhesive region D1, and rectangular solid right and left second marks M2 are provided on the portion of the base layer 21 in the non-adhesive region D3a in this example. Each of the first marks M1 and a corresponding one of the second marks M2 are arranged in a line in the up and down direction in FIG. 7A (i.e., the first direction). In the present modification, as illustrated in FIG. 8A, the marks M1, M2 are arranged within the shortest length WA of the adhesive region D1 in the second direction.

In the present modification, the above-described sticking of the print label L is performed such that the first marks M1 in the adhesive region D1 and the second marks M2 in the non-adhesive region D3a are respectively aligned to each other. Accordingly, it is possible to prevent misalignment and skew of the print label L and stick the portions of the print label L to each other in a proper posture.

3. Case with Shape Different from Isosceles Trapezoid

Figure 9B:
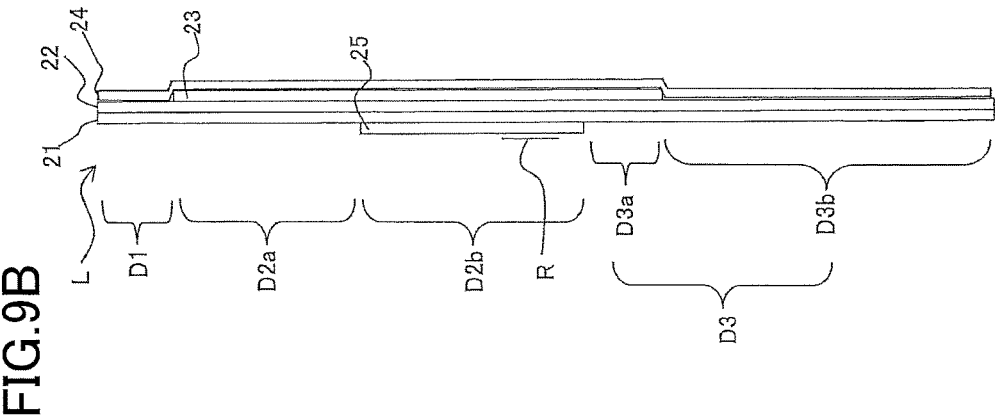
FIG. 9B is a cross-sectional view taken along line IXB-IXB in FIG. 9A.
Figure 9A:
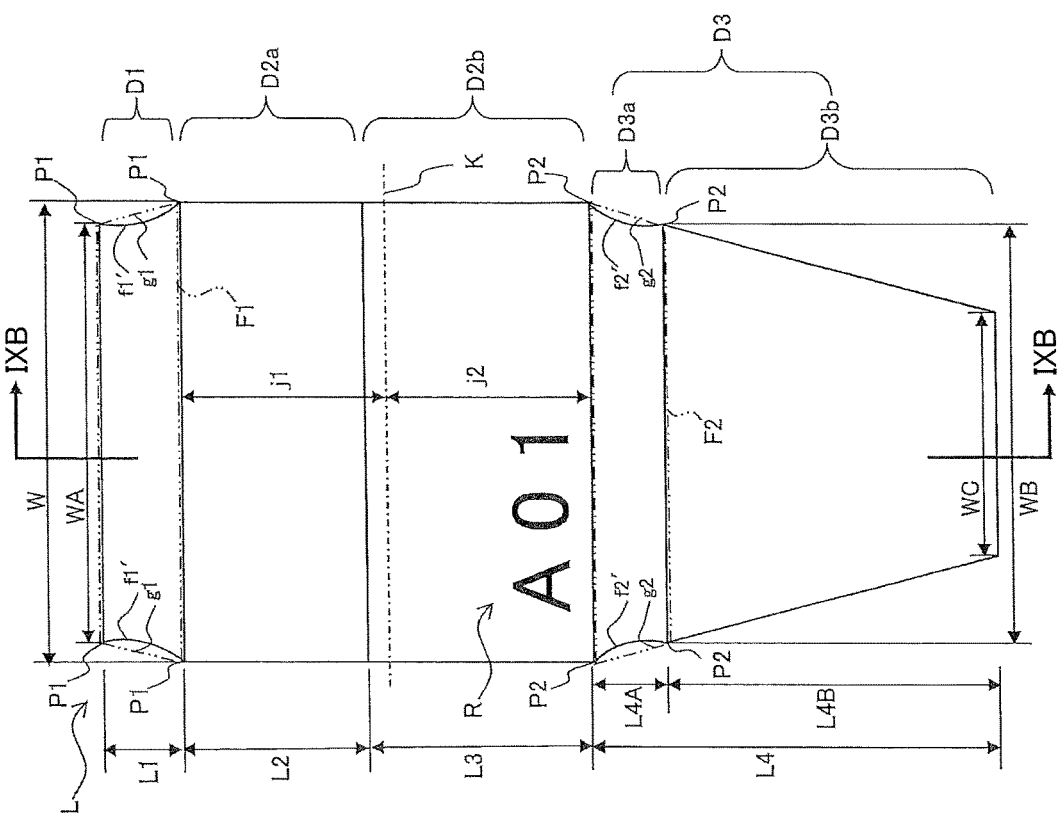
FIG. 9A is a plan view of a print label in a modification with a shape different from an isosceles trapezoid.

FIG. 9A is a plan view of the print label 1 in the present modification. FIG. 9B is a cross-sectional view taken along line IXB-IXB in FIG. 9A. FIGS. 9A and 9B respectively correspond to FIGS. 3A and 3B.

In the present modification, as described in FIGS. 9A and 9B, the outer edges of the adhesive region D1 and the non-adhesive region D3a are not the legs of the isosceles trapezoids in the above-described embodiment but are curved. That is, the adhesive region D1 has curved outer edges f1' each connecting corresponding adjacent two of four first vertexes P1 to each other, and the non-adhesive region D3a has curved outer edges f2' each connecting corresponding adjacent two of four second vertexes P2 to each other. The curved outer edges f1', f2' are symmetric with respect to the axis K.

Also, an imaginary trapezoid shape F1 having the four first vertexes P1 respectively located at corners of the outer shape of the adhesive region D1 and an imaginary trapezoid shape F2 having the four second vertexes P2 respectively located at corners of the outer shape of the non-adhesive region D3a are symmetric with respect to the axis K. In particular, outer edges g1 respectively corresponding to the legs of the imaginary trapezoid shape F1 and outer edges g2 respectively corresponding to the legs of the imaginary trapezoid shape F2 are symmetric with respect to the axis K.

In the present modification, as in the above-described embodiment, when the portion of the adhesive layer 22 in the adhesive region D1 is stuck to the portion of the non-adhesive layer 23 in the non-adhesive region D3a, the four first vertexes P1 and the four second vertexes P2 (the outer edges f1' and the outer edges f2', in other words) respectively coincide with each other. Accordingly, it is possible to prevent misalignment and skew of the print label L and stick the portions of the print label L to each other in a proper posture.

4. Case where Some Misalignment is Allowed in Sticking

Figure 10B:
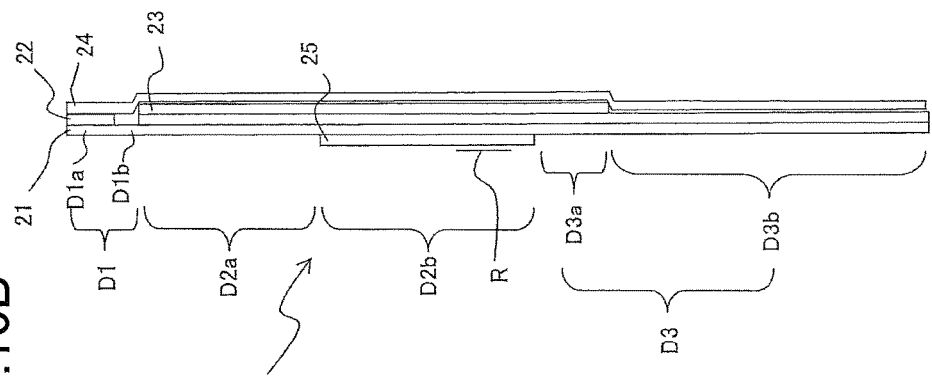
FIG. 10B is a cross-sectional view taken along line XB-XB in FIG. 10A.
Figure 10A:
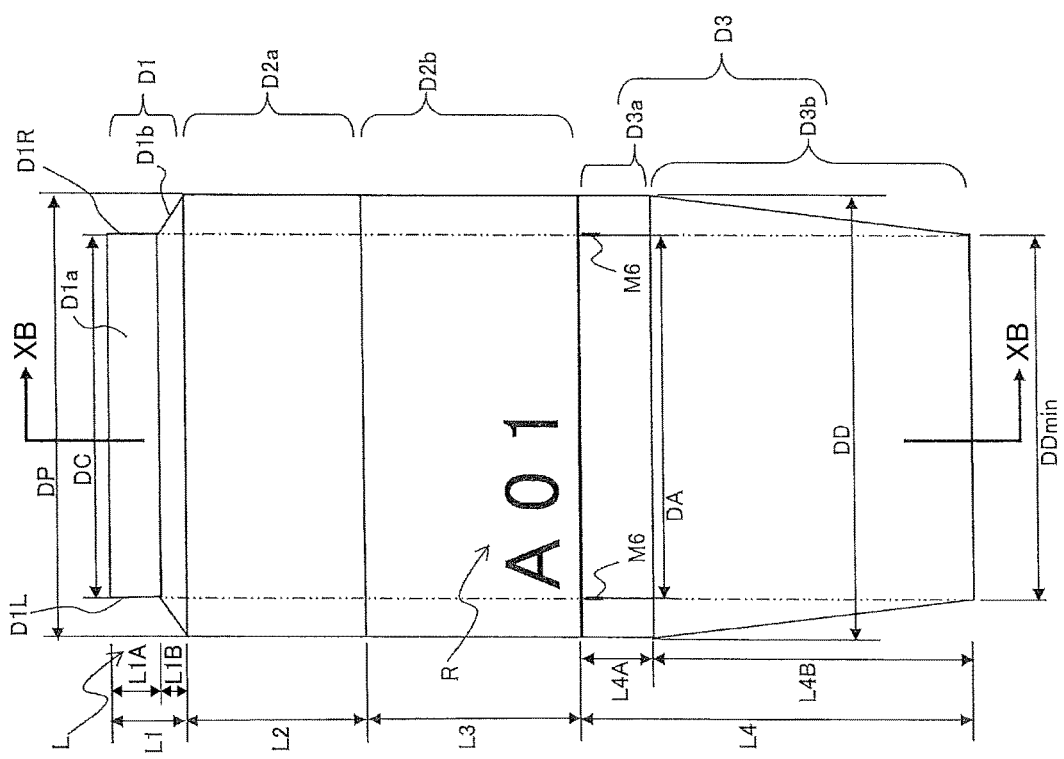
FIG. 10A is a plan view of a print label in a modification with straight-line marks.

FIG. 10A is a plan view of the print label L in the present modification. FIG. 10B is a cross-sectional view taken along line XB-XB in FIG. 10A. FIGS. 10A and 10B respectively correspond to FIGS. 3A and 3B.

In the present modification, as illustrated in FIGS. 10A and 10B, the adhesive region D1 is constituted by a rectangular adhesive portion D1a (as one example of a first region) and a trapezoidal surface portion D1b located on one side of the adhesive portion D1a in the first direction with no space therebetween. The adhesive portion D1a has a length L1A in the first direction, and the surface portion D1b has a length L1B in the first direction.

In the adhesive portion D1a of the adhesive region D1, the base layer 21, the adhesive layer 22, and the separation layer 24 are stacked in this order from the right side toward the left side in FIG. 10B, and the entire portion of the print label L which is in contact with the separation layer 24 is adhesive. In the surface portion D1b of the adhesive region D1, on the other hand, the base layer 21 and the separation layer 24 are stacked in this order from the right side toward the left side in FIG. 10B without the adhesive layer 22, and the entire portion of the print label L which is in contact with the separation layer 24 is not adhesive. It is noted that the adhesive layer 22 in the adhesive portion D1a may be provided only on right and left portions of the print label L in FIG. 10A. In other words, the adhesive layer 22 in the adhesive portion D1a may not be provided on an intermediate portion of the print label L in the right and left direction in FIG. 10A. The adhesive portion D1a has a length DC in the right and left direction in FIG. 10A. The length DC is one example of a longest length of the adhesive portion D1a. This length DC is less than a longest length DP of the adhesive region D1 in the right and left direction in FIG. 10A. It is noted that a region on the print label L which is occupied by the adhesive portion D1a extends in the first direction by the length L1A from the upper end of the print label L in the first direction and is interposed in the second direction between opposite ends, in the second direction, of a portion of the base layer 21 which extends from its upper end by the length L1A. A region on the print label L which is occupied by the surface portion D1b extends in the first direction by the length L1B from a lower end of the region occupied by the adhesive portion D1a and is interposed in the second direction between opposite ends, in the second direction, of a portion of the base layer 21 which extends by the length L1B from the lower end of the region occupied by the adhesive portion D1a.

The partly-adhesive region D3 is constituted by (a) a rectangular non-adhesive region D3a having the length L4A in the first direction and a length DD in the second direction and (b) a trapezoidal adhesive region D3b located on the one side of the non-adhesive region D3a in the first direction with no space therebetween. The length of adhesive region D3b in the second direction decreases in its distance from the non-adhesive region D3a. A lower end of the adhesive region D3b in FIG. 10A has a shortest length DDmin. It is noted that each of the non-adhesive region D2a (having the same configuration as in the above-described embodiment), the non-adhesive region D2b (having the same configuration as in the above-described embodiment), and the non-adhesive region D3a is one example of a second region. The adhesive region D3b is one example of a third region.

In the present modification, short straight-line marks M6 each extending in the first direction are provided on the portion of the base layer 21 in the non-adhesive region D3a. The two marks M6 (as one example of a pair of marks) are spaced apart from each other in the second direction. Each of the edges D1L, D1R of the adhesive portion D1a (as one example of a pair of first region edges) and a corresponding one of the marks M6 are aligned in the up and down direction in FIG. 10A, i.e., the first direction. That is, a position of the edge D1L in the second direction is substantially the same as a position of the left mark M6 in FIG. 10A in the second direction, and a position of the edge D1R in the second direction is substantially the same as a position of the right mark M6 in FIG. 10A in the second direction. A distance between the right mark M6 in FIG. 10A and the left mark M6 in FIG. 10A (a mark-to-mark distance, in other words) is a length DA that is substantially equal to the length DC. The longest length (the length DD in this example), in the second direction, of the print label L at a position at which the marks M6 are provided in the first direction is longer than the length DC of the adhesive portion D1a. The position at which the marks M6 are provided in the first direction is one example of a particular position in the first direction.

The present modification achieves effects described below. In the present modification, as in the above-described embodiment, the print label L is wrapped around the wrapped member 302 so as to form the cylindrical member surrounding the wrapped member 302. The portion of the adhesive layer 22 in the adhesive portion D1a of the adhesive region D1 is then stuck by the inner-sides sticking to the portion of the non-adhesive layer 23 in the partly-adhesive region D3 (the non-adhesive region D3a in this example). The portion of the print label L in the partly-adhesive region D3 is then stuck to the outer circumferential portions of the print label L in the non-adhesive region D2a and the non-adhesive region D2b while covering the non-adhesive region D2a and the non-adhesive region D2b, whereby the print label L is attached to the wrapped member 302 without adhesive therebetween.

The sticking is performed such that the edges D1L, D1R of the adhesive region D1 are aligned to the respective marks M6. Since the sticking is performed manually by the user, however, there is a possibility that the stuck position of the label L is displaced in the second direction, and the portion of the adhesive layer 22 in the adhesive region D1 partly lies off the print label L in the second direction. In the present modification, the longest length of the adhesive region D1 in the second direction (the length DC in this example) is less than the length of the non-adhesive region D3a in the second direction (the length DD in this example) at the particular position (i.e., the position of the marks M6 in the first direction). This configuration prevents the portion of the adhesive layer 22 in the adhesive region D1 from partly lying off the print label L in the second direction even in the case where the stuck position of the label L is displaced in the second direction in some degree. Accordingly, it is possible to prevent the adhesive layer 22 from lying off the print label L due to the misalignment in the sticking. In particular, it is possible to prevent the adhesive lying off the print label L from adhering to a hand of the user in the case where an amount of the misalignment is large in the configuration including the adhesive layer 22 as described above. Furthermore, an additional force such as a twisting of the wrapped member 302 is not applied to the print label L and the wrapped member 302 as in the conventional structure in which the print label L is wrapped around the wrapped member 302 and cut along the perforation.

In the present modification, in particular, the marks M6 are provided on the portion of the base layer 21 in the non-adhesive region D3a. In this case, the marks M6 are used to stick the portion of the print label L in the adhesive portion D1a to the portion of the non-adhesive layer 23 in the non-adhesive region D3a. Since the portion of the non-adhesive layer 23 in the non-adhesive region D3a is not adhesive, it is possible to facilitate position correction in the above-described sticking (i.e., an operation of peeling the stuck print label L and sticking the print label L again) when compared with the case where the portion of the print label L in the adhesive portion D1a is stuck to the portion of the adhesive layer 22 in the adhesive region D3b.

5. Case with Marks Each Having Aligned Outer Edge

Figure 11B:
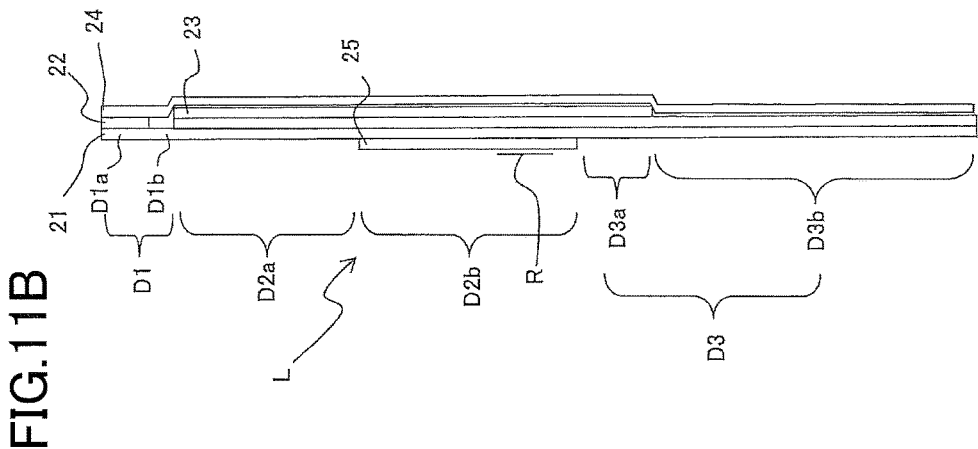
FIG. 11B is a cross-sectional view taken along line XIB-XIB in FIG. 11A.
Figure 11A:
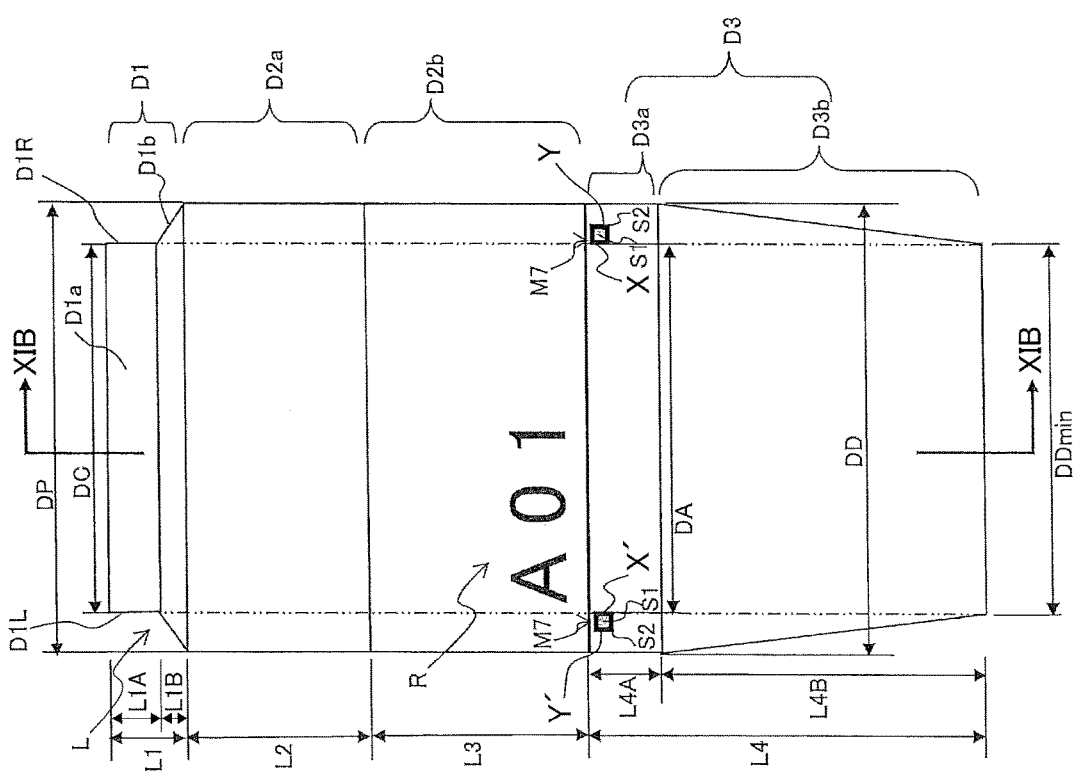
FIG. 11A is a plan view of a print label in a modification with marks each having an aligned outer edge.

FIG. 11A is a plan view of the print label L in the present modification. FIG. 11B is a cross-sectional view taken along line XIB-XIB in FIG. 11A. FIGS. 11A and 11B respectively correspond to FIGS. 3A and 3B.

In the present modification, as illustrated in FIGS. 11A and 11B, marks M7 are provided each at the above-described particular position in the first direction instead of the marks M6 provided in the non-adhesive region D3a in FIGS. 10A and 10B.

These two marks M7 (as another example of the pair of marks) are spaced apart from each other in the second direction. Each of the edges D1L, D1R of the adhesive portion D1a and a corresponding one of the marks M7 are aligned in the up and down direction in FIG. 11A, i.e., the first direction. Specifically, the right mark M7 in FIG. 11A includes a left edge X in FIG. 11A (as one example of a first mark edge) and a right edge Y in FIG. 11A (as one example of a second mark edge) which are opposed to each other in the second direction. The position of the edge X in the second direction is the same as the position of the right edge D1R of the adhesive portion D1a in the second direction in FIG. 11A. It is noted that the position of the edge Y in the second direction is different from the position of the edge D1R in the second direction. Likewise, the left mark M7 in FIG. 11A includes a right edge X' in FIG. 11A (as another example of first mark edge) and a left edge Y' in FIG. 11A (as another example of the second mark edge) which are opposed to each other in the second direction. The position of the edge X' in the second direction is the same as the position of the left edge D1L of the adhesive portion D1a in the second direction in FIG. 11A. It is noted that the position of the edge Y' in the second direction is different from the position of the edge D1L in the second direction. The distance between the left edge X of the right mark M7 in FIG. 11A and the right edge X' of the left mark M7 in FIG. 11A is the length DA that is substantially equal to the length DC.

The longest length (the length DD in this example) of the print label L at the position of the marks M7 in the first direction (i.e., the particular position) is greater than the length DC of the adhesive portion D1a.

In the present modification, as in the above-described modification, it is possible to prevent the portion of the adhesive layer 22 in the adhesive region D1 from partly lying off the print label L in the second direction even in the case where the stuck position of the label L is displaced in the second direction in some degree. Accordingly, it is possible to prevent the adhesive layer 22 from lying off the print label L due to the misalignment in the sticking. In particular, by performing the above-described sticking such that the edges D1L, D1R of the adhesive region D1 are aligned to the respective marks M7, it is possible to reduce the misalignment. In particular, the positions of the edges X, X' of the respective marks M7 in the second direction are the same as the respective positions of the edges D1R, D1L of the adhesive portion D1a in the second direction. Thus, by performing the above-described sticking such that the edges D1R, D1L are aligned to the respective edges X, X' of the marks M7, it is possible to further reduce the misalignment.

In the present modification, in particular, the positions of the edges Y, Y' of the respective marks M7 in the second direction and the positions of the respective edges D1R, D1L in the second direction are different from each other so as not to be aligned in the first direction, respectively. This configuration prevents the marks M7 from covering the character string R printed on the printing background layer 25.

6. Other Modifications

In the modifications illustrated in FIGS. 10A and 11A, the longest length DC of the adhesive portion D1a of the adhesive region D1 as the first region in the second direction may be less than the shortest length DDmin of the adhesive region D3b in the second direction.

In the above-described modifications, at least one of each mark provided in the adhesive region D1 and each mark provided in the non-adhesive region D3a may be an opening such as a through hole or a blind hole.

In the above-described explanation, one example of the stickability is adhesion (adhesiveness) of the adhesive of the adhesive layer 22, but the present disclosure is not limited to this configuration. For example, the present disclosure may use various structures including: a pressure pseudo-adhesive structure which is used for, e.g., postcards and in which a pseudo-adhesive portion of the label cannot be stuck once peeled; and a structure in which portions of the label are stuck to each other by static electricity like a resin sheet used for, e.g., wrapping. For example, the pseudo-adhesive material may have such a property that the material is wet before sticking, and once dried and peeled, the material cannot be stuck again.

While the terms "the same", "equal", "different", and the like are used for dimensions and sizes in external appearance in the above-described explanation, these terms are not strictly used. That is, tolerance and error in design and manufacture are allowed, and "same", "equal", and "different" may be respectively interpreted as "substantially the same", "substantially equal", and "substantially different".

Each arrow in FIG. 1 indicates one example of a flow of signals and does not limit a direction or directions of the flow of the signals.

The techniques in the above-described embodiment and the modifications may be combined as needed.

The present disclosure is not limited to the details of the illustrated embodiments and modifications, but may be embodied with various changes and modifications, which may occur to those skilled in the art, without departing from the spirit and scope of the disclosure.

What is claimed is:

1. A medium comprising a transparent base layer, an adhesive layer, and a separation layer stacked on each other in a stacking direction,
   wherein a plurality of regions are defined in the medium along a first direction orthogonal to the stacking direction,
   wherein the plurality of regions comprise:
      a first region in which a portion of the transparent base layer is stickable to the separation layer by the adhesive layer and comprises opposite end portions in a second direction orthogonal to each of the first direction and the stacking direction, and at least the opposite end portions are stickable;
      a second region which is located on one side of the first region in the first direction and in which a portion of the transparent base layer is non-stickable to the separation layer; and
      a third region which is located on the one side of the second region in the first direction and in which a portion of the transparent base layer is stickable to the separation layer by the adhesive layer,
   wherein a longest length of the first region in the second direction is less than a length of one of the second region and the third region in the second direction at a particular position in the first direction,
   wherein the first region comprises a first region edge that is an edge of the first region in the second direction, and
   wherein a mark is provided in the one of the second region and the third region at the particular position in the first direction and at a position identical to a position of the first region edge in the second direction.

2. The medium according to claim 1,
   wherein the first region comprises a pair of first region edges, each as the first region edge, which are spaced apart from each other in the second direction, and
   wherein a pair of marks each as the mark are provided in the one of the second region and the third region at the particular position in the first direction so as to be spaced apart from each other in the second direction.

3. The medium according to claim 1,
   wherein the mark comprises a mark edge that is an edge of the mark in the second direction, and
   wherein the first region edge and the mark edge are aligned to each other in the first direction.

4. The medium according to claim 3,
   wherein the mark comprises: a first mark edge, as the mark edge, and a second mark edge spaced apart from each other in the second direction, and
   wherein the first mark edge and the first region edge are aligned to each other in the first direction, and the second mark edge and the first region edge are not aligned to each other in the first direction.

5. The medium according to claim 1, wherein the particular position is located in the second region.

6. The medium according to claim 1, wherein the longest length of the first region in the second direction is less than a shortest length of the third region in the second direction.

7. The medium according to claim 1, wherein the adhesive layer is provided between a portion of the transparent base layer in the first region and a portion of the separation layer in the first region.

8. The medium according to claim 1, wherein the adhesive layer is disposed in at least a portion of an area located between the transparent base layer and the separation layer,
   wherein a non-adhesive layer is provided between the adhesive layer and the separation layer in at least one of the first region and the second region.

9. The medium according to claim 1, further comprising a printing background layer located on the one side of the second region in the first direction.

10. The medium according to claim 1, wherein a cross-sectional shape of the transparent base layer in a thickness direction thereof is continuous in the first direction throughout the first region, the second region, and the third region.

11. A tape cartridge, comprising:
    a housing; and
    a tape roll that is a roll of a tape contained in the housing and comprising a transparent base layer, an adhesive layer, and a separation layer stacked on each other in a stacking direction,
    wherein a plurality of regions are defined in the tape along a first direction orthogonal to the stacking direction,
    wherein the plurality of regions comprise:
       a first region in which a portion of the transparent base layer is stickable to the separation layer by the adhesive layer and comprises opposite end portions in a second direction orthogonal to each of the first direction and the stacking direction, and at least the opposite end portions are stickable;
       a second region which is located on one side of the first region in the first direction and in which a portion of the transparent base layer is non-stickable to the separation layer; and
       a third region which is located on the one side of the second region in the first direction and in which a portion of the transparent base layer is stickable to the separation layer by the adhesive layer, wherein a longest length of the first region in the second direction is less than a length of one of the second region and the third region in the second direction at a particular position in the first direction, wherein the first region comprises a first region edge that is an edge of the first region in the second direction, and wherein a mark is provided in the one of the second region and the third region at the particular position in the first direction and at a position identical to a position of the first region edge in the second direction.

\* \* \* \* \*